US008442189B2

(12) United States Patent
Michaelis et al.

(10) Patent No.: US 8,442,189 B2
(45) Date of Patent: May 14, 2013

(54) UNIFIED COMMUNICATIONS APPLIANCE

(75) Inventors: Paul Roller Michaelis, Louisville, CO (US); Jason H. Vick, Pine, CO (US)

(73) Assignee: Avaya Inc., Basking Ridge, NJ (US)

(*) Notice: Subject to any disclaimer, the term of this patent is extended or adjusted under 35 U.S.C. 154(b) by 967 days.

(21) Appl. No.: 12/489,043

(22) Filed: Jun. 22, 2009

(65) Prior Publication Data
US 2010/0322395 A1 Dec. 23, 2010

(51) Int. Cl.
*H04M 1/64* (2006.01)
*G06F 7/04* (2006.01)
*G10L 21/06* (2006.01)

(52) U.S. Cl.
USPC ............ 379/88.14; 340/286.07; 379/71; 379/88.17; 379/88.23; 379/88.27; 379/387.01; 382/128; 702/185; 704/257; 704/270; 704/275; 705/2; 706/12; 707/700; 709/204; 709/219; 709/227; 709/231; 709/246; 715/202; 715/727; 715/733; 717/106; 719/310; 719/328; 726/4

(58) Field of Classification Search ............ 379/71, 379/88.13, 88.14, 88.17, 88.23, 88.24, 88.27, 379/387.01; 455/418; 704/270, 257, 275; 709/204, 231, 246, 206, 219, 227; 715/727, 715/202, 733; 719/310, 328; 726/4; 340/286.07; 382/128; 702/185; 705/2; 706/12; 707/700; 717/106
See application file for complete search history.

(56) References Cited

U.S. PATENT DOCUMENTS

| 5,177,780 | A |   | 1/1993 | Kasper et al. |
|---|---|---|---|---|
| 5,313,515 | A |   | 5/1994 | Allen et al. |
| 5,734,915 | A | * | 3/1998 | Roewer .................. 715/202 |
| 6,006,218 | A | * | 12/1999 | Breese et al. .................. 1/1 |
| 6,272,469 | B1 | * | 8/2001 | Koritzinsky et al. ............. 705/2 |
| 6,353,445 | B1 | * | 3/2002 | Babula et al. ................ 715/733 |
| 6,377,162 | B1 | * | 4/2002 | Delestienne et al. .... 340/286.07 |
| 6,389,276 | B1 |   | 5/2002 | Brilla et al. |
| 6,424,996 | B1 | * | 7/2002 | Killcommons et al. ...... 709/206 |
| 6,434,572 | B2 | * | 8/2002 | Derzay et al. ................... 1/1 |
| 6,598,011 | B1 | * | 7/2003 | Howards Koritzinsky et al. ............................. 702/185 |
| 6,801,604 | B2 | * | 10/2004 | Maes et al. ................. 379/88.17 |
| 6,823,184 | B1 | * | 11/2004 | Nelson ......................... 455/418 |
| 6,839,896 | B2 | * | 1/2005 | Coffman et al. ............. 719/310 |
| 6,941,342 | B1 | * | 9/2005 | Nelson ......................... 709/204 |
| 6,983,138 | B1 |   | 1/2006 | Helferich |
| 6,996,800 | B2 | * | 2/2006 | Lucassen et al. ............. 717/106 |
| 7,013,279 | B1 | * | 3/2006 | Nelson ......................... 704/270 |
| 7,020,841 | B2 | * | 3/2006 | Dantzig et al. ............... 715/727 |

(Continued)

OTHER PUBLICATIONS

Official Action for U.S. Appl. No. 12/488,970, mailed Oct. 13, 2011.

(Continued)

*Primary Examiner* — Gerald Gauthier

(74) *Attorney, Agent, or Firm* — Sheridan Ross P.C.

(57) ABSTRACT

A unified communications appliance provides integration of various types of information, regardless of the modality, in a common, centralized interface where the various types of information are grouped based on what they are related to. For example, as is common with most modalities of information exchange, there exists a "subject" that is present in one of the fields of communication. The ability to associate all of the types of communication with a common "subject" (or conversation) and provide an interface that allows access to the various types of information, regardless of the modality is provided by the unified communications interface.

20 Claims, 11 Drawing Sheets

U.S. PATENT DOCUMENTS

| | | | |
|---|---|---|---|
| 7,106,852 B1 * | 9/2006 | Nelson et al. | 379/387.01 |
| 7,127,499 B1 * | 10/2006 | Accardi et al. | 709/219 |
| 7,137,126 B1 * | 11/2006 | Coffman et al. | 719/328 |
| 7,167,830 B2 * | 1/2007 | Sravanapudi et al. | 704/275 |
| 7,216,351 B1 * | 5/2007 | Maes | 719/328 |
| 7,260,190 B2 * | 8/2007 | Fellenstein et al. | 379/88.24 |
| 7,286,649 B1 * | 10/2007 | Nelson et al. | 379/71 |
| 7,315,613 B2 * | 1/2008 | Kleindienst et al. | 379/88.13 |
| 7,369,647 B2 | 5/2008 | Gao et al. | |
| 7,369,649 B2 * | 5/2008 | Zhong | 379/88.27 |
| 7,383,282 B2 * | 6/2008 | Whitehead et al. | 707/700 |
| 7,418,086 B2 * | 8/2008 | Sravanapudi et al. | 379/88.13 |
| 7,457,879 B2 * | 11/2008 | Horvitz et al. | 709/227 |
| 7,478,171 B2 * | 1/2009 | Ramaswamy et al. | 709/246 |
| 7,606,405 B2 * | 10/2009 | Sawyer et al. | 382/128 |
| 7,606,861 B2 * | 10/2009 | Killcommons et al. | 709/206 |
| 7,885,392 B2 | 2/2011 | Fujita-Yuhas | |
| 7,978,830 B2 | 7/2011 | O'Neill | |
| 8,140,335 B2 * | 3/2012 | Kennewick et al. | 704/257 |
| 8,250,630 B2 * | 8/2012 | Mendonca | 726/4 |
| 2006/0155267 A1 * | 7/2006 | Berzak et al. | 606/20 |
| 2007/0116197 A1 | 5/2007 | O'Neill | |
| 2007/0150612 A1 * | 6/2007 | Chaney et al. | 709/231 |
| 2009/0171203 A1 * | 7/2009 | Avital et al. | 600/439 |
| 2009/0227293 A1 | 9/2009 | Yulo | |
| 2010/0020944 A1 | 1/2010 | Ray | |
| 2010/0322395 A1 * | 12/2010 | Michaelis et al. | 379/88.14 |
| 2010/0322397 A1 * | 12/2010 | Kale et al. | 379/88.23 |
| 2011/0143722 A1 | 6/2011 | Shaw et al. | |
| 2011/0258153 A1 * | 10/2011 | Kamar et al. | 706/12 |

OTHER PUBLICATIONS

Official Action for U.S. Appl. No. 12/488,970, mailed Feb. 20, 2013, 9 pages.

* cited by examiner

Unified Communications Appliance

| Subject | From | Time | Size |
|---|---|---|---|
| Product T/C | Scott, VP, Jill | Yesterday, 12:01 p.m. | Total: Last: |
| | Scott | Today, 7:23 a.m. | |
| | Jill | Today, 8:02 p.m. | |
| | VP | Today, 9:28 p.m. | |
| | VP, Jill | Today, 10:55 p.m. | |
| | Scott | Today, 11:01 p.m. | |
| | Jill | Today, 4:20 p.m. | |
| | Team 1 | Today, 4:55 p.m. | |
| | Scott | Today, 4:58 p.m. | |
| | Team 2 | Today, 5:11 p.m. | |
| | Scott, VP, Jill, Team 1, Team 2 | Today, 5:23 p.m. | |

Consectetuer adipiscing elit, sed diam nonummy nibh euismod tincidunt ut laoreet dolore magna aliquam erat volutpat. Ut wisi enim ad minim veniam, quis nostrud exerci tation ullamcorper suscipit lobortis nisl ut aliquip ex ea commodo consequat. Duis autem vel eum iriure dolor in hendrerit in vulputate velit esse molestie consequat, vel illum dolore eu feugiat nulla facilisis at vero eros et accumsan et iusto odio dignissim qui blandit praesent luptatum.

Ut wisi enim ad minim veniam, quis nostrud exerci tation ullamcorper suscipit lobortis nisl ut aliquip ex ea commodo consequat. Duis autem vel eum iriure dolor in hendrerit in vulputate velit esse molestie consequat, vel illum dolore eu feugiat nulla facilisis at vero eros et accumsan et iusto odio dignissim qui blandit praesent luptatum zzril delenit augue duis dolore te feugait nulla facilisi. Nam liber tempor cum soluta

Fig. 3

UNIFIED COMMUNICATIONS APPLIANCE

CROSS REFERENCE TO RELATED APPLICATIONS

This application is related to Ser. No. 12/488,970, entitled "METHOD TO SET THE FLAG AS REPLIED OR FORWARDED TO ALL REPLIED OR FORWARDED VOICE MESSAGES," filed herewith, which is incorporated herein by reference in its entirety.

BACKGROUND OF THE INVENTION

Electronic mail, also known as email, is a method of exchanging digital information, such as text, images, multimedia, and the like. A typical email message includes content, an author, address and one or more recipient addresses. Emails can be exchanged between one or more communications devices that are generally associated with the user designated in the "From" or "To" field. The communication of the email messages between the parties is typically accomplished using a Mail Transfer Agent (MTA), which is also known as a Mail Transport Agent, Message Transfer Agent, or SMTP DAEMON. Mail servers are one or more computers that act as an MTA to assist with sending and receiving email messages, storing email messages, managing user preferences, and the like.

Many email clients, that use an email server, also provide additional features, such as a calendar, contacts or address book, tasks, a notepad and the ability to organize emails in one or more folders. Each of these tools that assist with communication, organization, and workflow management typically have a subject and other relevant information, such as location, start and end times, due date, contact information, or the like.

Short Message Service (SMS) is a communication service standardized in mobile communication systems, using standardized communications protocols that allow the interchange of short text messages between mobile telephone devices. SMS is the underlying technology that has facilitated the widespread adoption and growth of text messaging that allows communications to be exchanged between one or more mobile communications devices. While most SMS messages are mobile-to-mobile text messages, the SMS standard also supports types of broadcast messaging as well.

Voicemail is a centralized system managing telephone messages for a user, and is commonly seen in enterprise-type environments where a voicemail system provides telephone message management for a large number of people. A typical voicemail system can allow the answering and recording of multiple voicemail messages in parallel. Additional functionality includes the ability to store incoming voice messages in personalized mailboxes associated with a particular user's phone number or extension. In addition, users are capable of forwarding messages to another mailbox, and sending messages to one or more other voicemail users. In conjunction with both of these functions, a user can add a voice introduction to a forwarded message and store a voice message for future delivery, to one or more other users.

Other functionality associated with voicemail systems is the ability to make calls to a telephone or paging service to notify a user a message has arrived in their mailbox, as well as the ability to provide messaging notification by SMS, a special dial tone, a light(s), or using caller ID signaling. Furthermore, a user can be alerted to the existence of a new voicemail message through the integration and communication between the voice message server and any mail client. For example, the voicemail server can forward a .wav file that includes the left message to an email server that then displays the voicemail message as a playable file in a user's email inbox.

Instant messaging (IM) is a form of real-time communication between two or more people based on typed text. The text is conveyed via devices, which are typically mobile devices, connected over a network such as the Internet. IM allows effective and efficient communication featuring real-time receipt of acknowledgement or reply and in certain cases involves additional features, such as the ability to see the other party, for example, by using webcams, or talk directly for free over the Internet. IM tools make it possible to save a conversation for later reference with IMs typically being logged in a local message history, which closes the gap to the persistent nature of emails and facilitates quick exchange of information like URLs, document snippets, or in general any type of information.

Conference calls are telephone calls in which a calling party wishes to have more than one called party participate in the call. Conference calls can be constructed to allow the called party to participate during the call, or the call may be set up so that the called party merely listens to the call and is unable to communicate with the other participants. Similar to conference calls, web conferencing, or webinars, are used to conduct live meetings or presentations via the Internet. In a web conference, each participant can sit at their own computer and is connected to other participants via the Internet. Typically webinars are implemented via either a downloaded application with a specific user interface, or a web-based application where the attendees simply enter a URL to enter the conference. This can sometimes be associated with user names and passwords and, similar to a conference call, can be constructed to be one-way, or interactive in nature between multiple parties. Some features associated with web conferencing include the ability to present slide shows, show live or streaming video, can support VOIP, web tours, the recording of the meeting, whiteboarding with the ability to annotate what others have drawn on the whiteboard, the ability to chat real time between one or more of the other meeting participants, generally supports polls and surveys, as well as screen, desktop, and/or application sharing between one or more of the participants.

Document management systems are computer-based systems that are used to track and store electronic documents, images, multimedia presentations and/or electronic versions of paper documents. Similar to the concept of a content management system, document management systems overlap content management systems and can generally be viewed as enterprise contact management (ECM) that relate to digital asset management, document imaging, document management, workflow systems and record management systems. Document management systems, and enterprise content management, commonly provide storage, versioning, metadata, security, as well as indexing, retrieval, backup and export capabilities for one or more of the assets that they are maintaining.

SUMMARY

Each of the above modalities for exchanging information is typically associated with their own interface that allows management of the information. While each of the interfaces may include functionality specific to the modality of communication, in general the interfaces allow similar functions that facilitate the exchange, management and organization of information.

However, a drawback exists in that while each of the interfaces allows efficient management of their respective modality of communication, the ability to integrate the disparate types of communication into a single interface would provide enhanced functionality, such as the ability to maintain all information related to a particular subject in a common location.

One exemplary embodiment therefore maintains one or more links between one or more communications (and/or documents), regardless of the media type of the one or more communications.

Another exemplary embodiment threads one or more communications (and/or documents), regardless of the media type or modality of the one or more communications.

An additionally exemplary embodiment threads one or more communications (and/or documents), from one or more dialogs or communications sessions, regardless of the media type, modality or timing of the one or more communications.

Yet another exemplary aspect of the present invention is directed toward a unified communications appliance that allows integration of various types of information, regardless of the modality, in a common, centralized interface where the various types of information are grouped based on what they are related to. For example, as is common with most of the above modalities of information exchange, there exists a "subject" that is present in one of the fields of communication. The ability to associate all of the types of communication with a common "subject" (or conversation) and provide an interface that allows access to the various types of information, regardless of the modality, is disclosed herein.

For example, assume a workplace-type environment where a number of individuals or teams are working on a specific project. As the project develops, numerous types of documents are created, there are multiple exchanges of different types of communications between the parties, including emails, voice messages, conference calls, video conferences, and the like. A user, desiring to organize all these various types of information, regardless of the modality, is provided with a unified communications appliance that includes an interface that allows the grouping, access, management, and functionality of the various specific interfaces associated with the specific type of communication to be integrated into one interface. Within this interface, the various communications are grouped by "subject," in this exemplary case, all the communications grouped based on the specific project that the individuals are working on. Once grouped together, the user is provided with a common means to access all information related to that specific project or "subject."

In addition, information about the various types of information is provided in this interface, such as the native modality of the information, as well as information appropriate for the type of communication, such as whom it is from, time, date, size information, author information, editor information, participant information, or in general any information of available about the underlying information itself.

Furthermore, the unified communications appliance transverses the modality-specific nature of the various communications to allow unified management of the communications and/or documents via one interface. To assist with this integration, one or more of text-to-speech, speech-to-text, optical character recognition, and the like can be used to assist with automatic integration and classification of the information in the unified communications appliance.

In addition, subject matter, keyword information, sender information, recipient information, time and date stamp information, and in general any information associated with an underlying communication or document can also be used to assist with the automated classification of the information.

A further aspect of the invention relates to reconciliation and integration of the various communications from different communication devices into the unified communications appliance. For example, an integration module can be appropriately situated to either push or pull information from each communications device associated with the unified communications appliance. It is able to maintain a "master record" of all communications associated with a user. For example, this integration can occur across a PC, mobile phone, work phone, PDA, an enterprise email client or the like.

Additionally, the unified communications appliance allows integration of other information into a particular subject. For example, a user can manually add documents, presentations, images, multimedia presentations, multimedia, or in general any type of information into the unified communications appliance, which than then be associated with a particular subject. An icon representing the native modality of the information can also be associated with the information and a number presented with the icon that represents the total pieces of information of that type associated with that particular subject.

Furthermore, the unified communications appliance allows the user to select the type of modality they would like to respond to a communication(s) with. For example, if a voicemail message is left regarding a particular project, that voicemail message, based on a speech-to-text analysis, and keyword recognition, can be associated with that project's collection of information. Upon listening to the voicemail, perhaps the user desires to respond via an email instead of calling the individual that left the voicemail. Thus, for example, upon completion of the user listening to the voicemail message, the unified communications appliance can prompt the user as to how they would like to respond to the voicemail message, by providing a selection of the various types of communications available to the user. For example, this could include email, instant messaging, or a return phone call. Upon the user selecting one of these desired modalities for returning the voicemail, the unified communications appliance could launch the appropriate interface to allow completion of the return communication. For example, if the user selects to return the voicemail via email, an email interface could be provided to the user, with the option provided to the voicemail recipient of including the recorded voicemail message and/or the speech-to-text version of the voicemail message in the body of the email. This is similar to the way email clients quote previous messages in the body of the email. Additionally, information associated with the left voicemail, such as caller ID, time/date and the like could also be associated with the email, such as in the "Re:" line.

Alternatively, if a user who received a voicemail elects to return the call to the individual that left the voicemail message, the voicemail recipient can select "return call" at which point, for example, a soft phone interface could be activated on the unified communications appliance that allows a call to be placed to the individual that left the voicemail. In a similar manner, if the voicemail recipient elects to send an instant message to the individual that left the voicemail, an appropriate interface can be provided that allows the sending of instant messages.

Additionally, and in accordance with one exemplary embodiment, a combination of automatic classification with manual confirmation of that classification can be provided. For example, the unified communications appliance can do an initial assessment of the received information, and determine with which subject that information should be associated. A prompt could then be provided to the user querying whether the automatically determined classification is correct, or whether another classification is more appropriate. The unified communications appliance can then dynamically learn based on any feedback from the user where specific information should be stored and associated, to assist with future classification tasks.

Accordingly, an exemplary aspect of the present invention is directed toward a unified communications appliance.

An additional aspect of the invention relates to integrating one or more mail feeds into the unified communications appliance.

Additional aspects of the invention relate to integrating one or more SMS feeds into the unified communications appliance.

Even further aspects relate to integrating one or more instant messaging feeds into the unified communications appliance.

Still further aspects of the invention relate to integrating one or more calendar feeds into the unified communications appliance.

Additional aspects relate to integrating one or more voicemail feeds into the unified communications appliance.

Even further aspects relate to integrating one or more conference call feeds into the unified communications appliance.

Still further aspects relate to integrating one or more other types of communications, documents, or in general any type of information into the unified communications appliance.

Aspects of the invention also relate to analysis and classification of information received via one or more of the above feeds into an appropriate category in the unified communications appliance.

Additional aspects of the invention relate to harmonizing communications on disparate devices into a single interface. From this interface, various actions can be taken to assist with one or more of responding to, forwarding, editing, and managing the communication and/or document.

Even further aspects of the invention relate to the organization of various types of information, independent of their modality, in a single management interface.

Even further aspects of the invention relate to displaying an icon representing the modality of the communication and/or document.

Further aspects relate to the ability to manage information in the unified communications appliance via an interface that allows organization and sorting by one or more of subject, to or from information, time and/or date stamp information, and a number of pieces of information associated with a particular subject.

Even further aspects of the invention relate to a new paradigm for managing communications and information that is subject-based and, for example, further based on one or more of content and context.

The present invention can provide a number of advantages depending on the particular configuration. These and other advantages will be apparent from the disclosure of the invention(s) contained herein.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic even if performance of the process or operation uses human input, whether material or immaterial, received before performance of the process or operation. Human input is deemed to be material if such input influences how the process or operation will be performed. Human input that consents to the performance of the process or operation is not deemed to be "material."

The term "computer-readable medium" as used herein refers to any tangible storage and/or transmission medium that participate in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like.

While circuit or packet-switched types of communications can be used with the present invention, the concepts and techniques disclosed herein are applicable to other protocols.

Accordingly, the invention is considered to include a tangible storage medium or distribution medium and prior art-recognized equivalents and successor media, in which the software implementations of the present invention are stored.

The terms "determine," "calculate" and "compute," and variations thereof, as used herein, are used interchangeably and include any type of methodology, process, mathematical operation or technique.

The term "module" as used herein refers to any known or later developed hardware, software, firmware, artificial intelligence, fuzzy logic, or combination of hardware and software that is capable of performing the functionality associated with that element. Also, while the invention is described in terms of exemplary embodiments, it should be appreciated that individual aspects of the invention can be separately claimed.

The preceding is a simplified summary of the invention to provide an understanding of some aspects of the invention. This summary is neither an extensive nor exhaustive overview of the invention and its various embodiments. It is intended neither to identify key or critical elements of the invention nor to delineate the scope of the invention but to present selected concepts of the invention in a simplified form as an introduction to the more detailed description presented below. As will be appreciated, other embodiments of the

BRIEF DESCRIPTION OF THE DRAWINGS

FIG. 3 illustrates in greater detail a portion of the unified communications appliance interface according to this invention;

DETAILED DESCRIPTION

The invention will be described below in relation to a communications environment. Although well suited for use with circuit-switched or packet-switched networks, the invention is not limited to use with any particular type of communications system or configuration of system elements and those skilled in the art will recognize that the disclosed techniques may be used in any application in which it is desirable to provide enhanced communications. For example, the systems and methods disclosed herein will also work well with SIP-based communications systems and endpoints. Moreover, the various endpoints described herein can be any communications device such as a telephone, speakerphone, cellular phone, SIP-enabled endpoint, softphone, PDA, conference system, video conference system, wired or wireless communication device, or in general any communications device that is capable of sending and/or receiving voice and/or data communications.

The exemplary systems and methods of this invention will also be described in relation to software, modules, and associated hardware and network(s). In order to avoid unnecessarily obscuring the present invention, the following description omits well-known structures, components and devices that may be shown in block diagram form, are well known, or are otherwise summarized.

For purposes of explanation, numerous details are set forth in order to provide a thorough understanding of the present invention. It should be appreciated however, that the present invention may be practiced in a variety of ways beyond the specific details set forth herein.

As used herein, the terms "subject," "conversation," "information," and "conversation item" will be used to discuss types of information handled by the unified communications appliance. More specifically, a conversation or conversation item will generally be directed toward communication(s) exchanged by one or more parties. Information will be directed toward information, such as a document, image, multimedia presentation, or the like, and in general any digital file, which can be associated with a particular subject, and optionally accessed/edited by one or more participants of a conversation. As used herein, the terms "conversation" and "subject" are used interchangeably to denote a particular grouping of related information.

Figure 1:
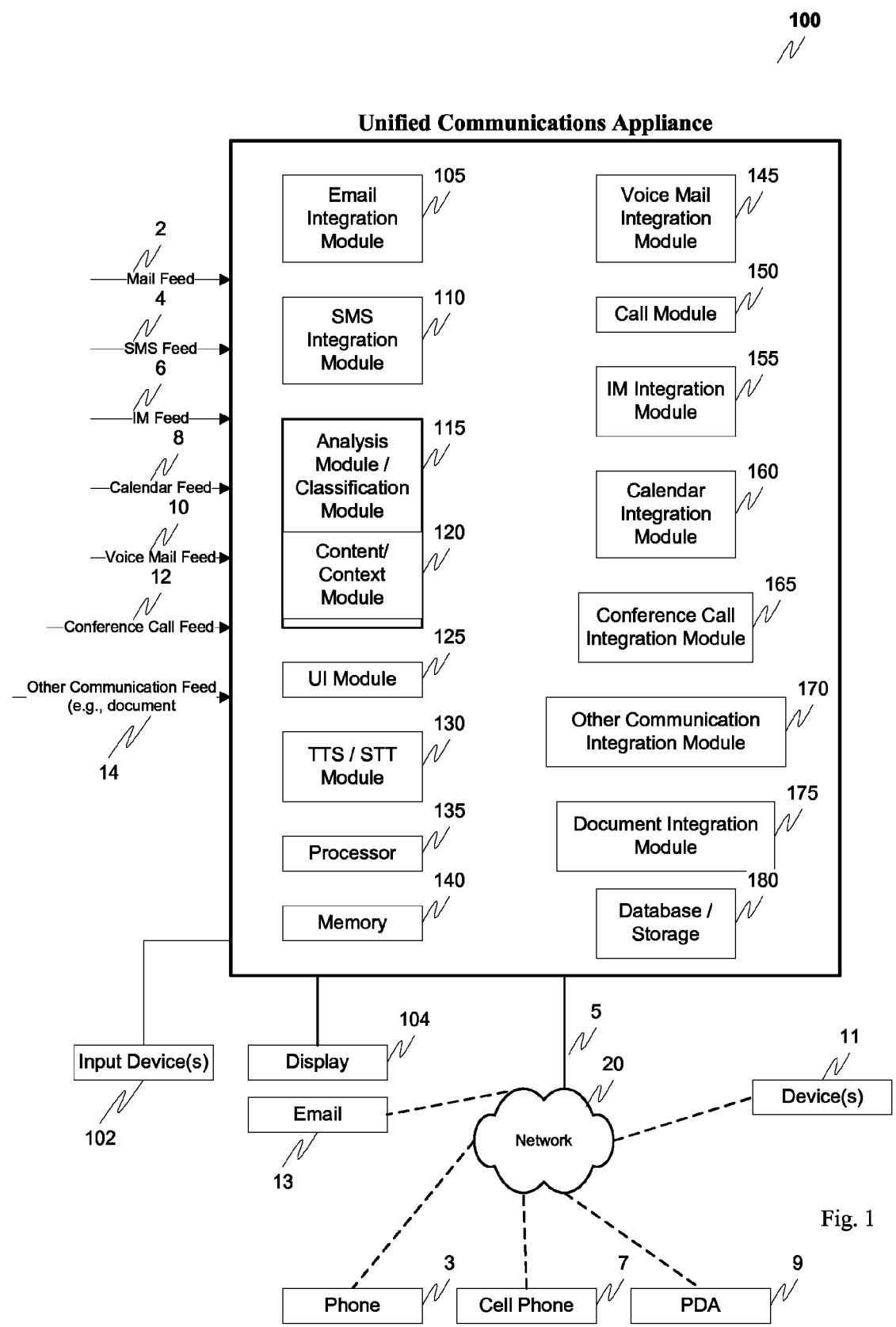
FIG. 1 illustrates an exemplary unified communications appliance according to this invention.

FIG. 1 illustrates an exemplary unified communications appliance 100. The unified communications appliance 100 includes an email integration module 105, a SMS integration module 110, an analysis module/classification module 115, associated with a content/context module 120, a user interface module 125, a text-to-speech/speech-to-text module 130, a processor 135, memory 140, voicemail integration module 145, call module 150, IM integration module 155, calendar integration module 160, conference call integration module 165, other communication integration module 170, document integration module 175 and database/storage 180. The unified communications appliance 100 can be connected to, for example, one or more input devices 102, such as a keyboard, mouse, microphone, camera, or the like, as well as a display 104. The unified communications appliance 100 can further be connected to one or more wired or wireless networks 20 via one or more links 5 and associated devices such as the phone 3, cell phone 7, PDA 9, email client 13 and other device(s) 11.

The unified communications appliance 110 can also be associated with one or more feeds, such as mail feed 2, SMS feed 4, IM feed 6, calendar feed 8, voicemail feed 10, conference call feed 12, other communication feed 14 which can also include a document feed. Additionally, and not shown, can be one or more reconciliation modules associated with the communications devices that are associated with the unified communications appliance. For example, a cell phone, PDA, and one or more email clients can be equipped with this module to assist with facilitating reconciliation of the communications on each of the devices into the unified communications appliance 100. Therefore, for example, additional feeds can be associated with the unified communications appliance 100, such as a feed from the user's cell phone, as well as a feed from the user's PDA that allows integration of the communications from those devices into the unified communications appliance 100. For example, emails, calls from the call log, text messages and the like from these devices can be reconciled into the unified communications appliance 100 as discussed in greater detail hereinafter.

While the integration module is preferably implemented on each communications device associated with the unified communications appliance 100, this is not necessary as either a push to the unified communications appliance 100 could be used equally as well as a pull from the unified communications appliance 100 to the associated communications device.

For example, if a user desires to associate their PDA with the unified communications appliance 100, the PDA could be configured such that each communication received at, or sent from the PDA is copied into the unified communications appliance 100. Therefore, all voicemails, emails, text messages, instant messages, or the like, that are handled by the PDA are automatically replicated and copied into the unified communications appliance 100 for classification into an appropriate subject. While the unified communications appliance 100 can be implemented on a personal computer, it is also possible to implement the unified communications appliance 100, or a portion thereof, such as the user interface itself, on a mobile communications device, such as a PDA. Therefore, the same functionality and content grouping could be accessed either locally on the PC, or remotely in the PDA or remote communications device.

Moreover, a web-based access to a user interface, that allows access to the various information associated with the unified communications appliance 100, could also be provided. In accordance with yet another exemplary embodiment, the unified communications appliance 100 can be used as a data store, that is capable of storing the various portions of information that are being managed by the appliance. Alternatively, or in conjunction with this storage capability, the unified communications appliance 100 can maintain pointers that allow for the storage to be implemented on the respective communications device(s) from which information or communication is received. Thus, for example, if a voicemail was received on a user's phone that was associated with the unified communications appliance 100, the voicemail message could be stored on one or more of the cell phone, and in the database/storage 180. Upon a user accessing this voicemail, the voicemail could be retrieved from the database 180 or from phone based on, for example, bandwidth requirements, user preferences, or the like. In general, the operation of the unified communications appliance 100 is not limited by where the information is stored, provided a link and accessibility to the stored information is available.

In operation, a user sets up the unified communications appliance 100 by associating one or more types of information feeds with the appliance. As discussed, these feeds can be from various information sources, and in general can be from any type of communications modality, and also include any type of document or digital content as previously discussed. Once the various feeds are associated with the unified communications appliance 100, as information is received the unified communications appliance begins building subject headings into which the various pieces of information are assimilated.

Figure 2:
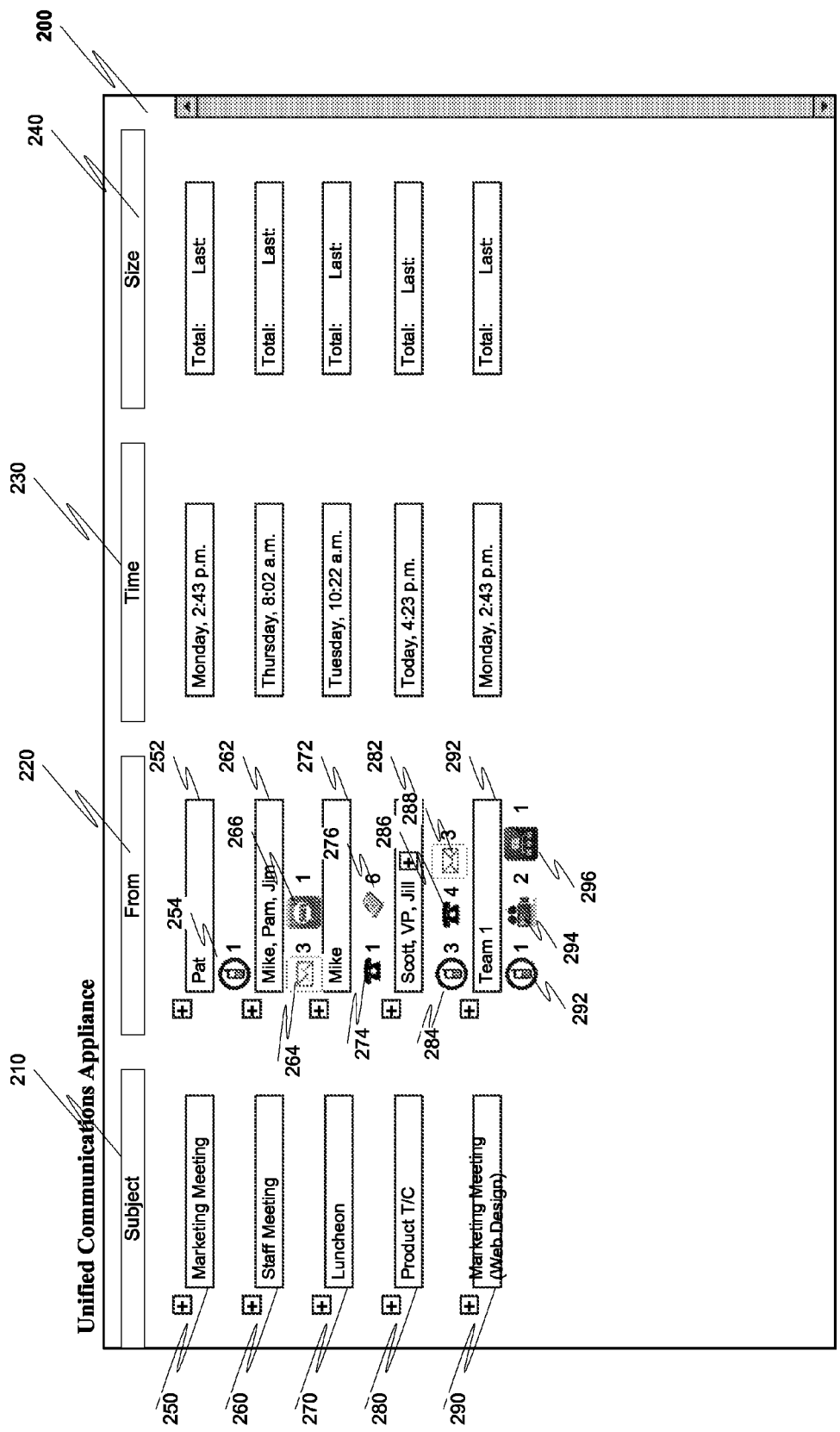
FIG. 2 illustrates an exemplary unified communications appliance interface according to this invention.

Assimilation and classification of the various portions of information will be further described in relation to FIGS. 2 and 3 that illustrate exemplary user interfaces managed by the user interface module 125. These user interfaces provide access to the various portions of information, and graphically illustrate not only the type of communication, but the subject or conversation with which the communication or document is associated.

Upon associating the various devices and feeds with the unified communications appliance 100, a user can manually create a number of subject categories into which communications and documents can be associated. In another embodiment, the analysis and classification module 115 can assist the user by automatically determining, based for example on analysis of the content of the communication or document, a subject heading that can be used for the basis for a collection of information and/or documents. For example, and as illustrated in interface 200, a subject column 210 is illustrated that includes five exemplary subjects 250-290 corresponding to subjects the user wishes to correlate one or more pieces of information, documents, or threads.

In this exemplary embodiment, the subjects include "Marketing Meeting" 250, "Staff Meeting" 260, "Luncheon" 270, "Product Telephone Conference" 280 and "Marketing Meeting (Web Design)" 290. Associated with each of the subjects, is a corresponding from column 220, time column 230 and optional size column 240. The "from" column 220 includes information such as who the communication is from, or, alternatively, if the information is a document, can optionally include information such as author information, editor information, or the like. The time column 230 can include, for example, the time stamp of the most recent communication or document added to the subject.

As discussed, the user interface 200 can also include icons representing not only the types of communication and/or documents associated with a subject, but also the number of those communications and/or documents. For example, the Marketing Meeting subject 250 includes an icon 254 indicating that one call from a mobile telephone from Pat is associated with that subject.

For the subject 260, and as represented by icon 264, there are three emails, and one SMS message, as represented by icon 266, associated with the Staff Meeting 260. The "from" portion of the interface 262 indicates that Mike, Pam and Jim were contributors to the information in subject 260.

Luncheon conversation 270 includes an indicator 272 that Mike has contributed to the information associated with that subject, and is represented by icon 274, one telephone call from a landline telephone is associated with the subject 270, as well as six documents, as represented by icon 276.

Product Telephone Conference subject 280 includes an indicator 282 that at least Scott, a vice president, Jill, and others as represented by the "+" icon, contributed to that subject. Furthermore, three calls from a cell phone, as represented by icon 284, four calls from a land line telephone, as represented by icon 286, and three emails, as represented by icon 288, are associated with subject 280.

The Marketing Meeting (Web Design) conversation 290 includes similar information such that Team 1 has participated in the communications as represented by portion 292, and that the communications have been one cell phone communication as represented by icon 292, two video conferences, as represented by icon 294, and one web conference, as represented by icon 296.

As will be appreciated, the information displayed in the from column 220 need not be limited to the exemplary embodiment shown, but could be varied to include, for example, the name of the most recent contributor, the names of all the contributors, or an abbreviated portion of the contributors.

This basic type of organizational structure and information display can then be used as the information from the various feeds is integrated into the unified communications appliance 100.

The email integration module 105 can be configured to operate in parallel with an existing email client, or can support email communications directly. For example, the email integration module 105 can be provided with the necessary information, such as SMTP and POP settings, or pointed to an email server, such that the email integration module 105 can provide conventional email client functionality such as sending, receiving, forwarding, and the like. Once configured, the email integration module 105 receives one or more emails from the mail feed(s) for integration into the unified communications appliance 100. To assist with classification of the received emails in one or more subjects in the unified communications appliance 100, the email integration module 105, cooperating with the analysis module 115, extracts the current re: line from a sent or received email. Next, and optionally, the email integration module 105, cooperating with the analysis module 115, can parse one or more portions of the email and extract one or more previous re: lines. Next, and optionally, one or more of from, to, cc, and bcc information can be extracted from the sent or received email. Additionally, the email integration module 105 can optionally cooperate with the content module 120 to analyze the content of the email and, for example, identify key words therein that can be used in conjunction with the above extracted information to assist with classification as discussed hereinafter.

While the embodiments described herein below will be discussed in relation to incoming feeds of information, it should be appreciated that the unified communications appliance 100, as discussed in greater detail hereinafter, can actually be used as the source for generating information, such as emails, outbound calls, and the like. Therefore, the unified communications appliance 100 can be used to assimilate information that is received from the one or more feeds, as well as assimilate information outgoing from the unified communications appliance 100 to other destinations. For example, the unified communications appliance 100, cooperating with the email integration module 105, can actually function as an email client thereby providing all the conventional functionality that is typically associated with known email clients in the industry.

Once the one or more portions of information are extracted from an incoming email, this extracted information can be preserved as, for example, metadata that is used by the classification module 115 to assist with classification of the email into the unified communications appliance 100. This metadata can be stored in conjunction with the email in database 180 and further analyzed with weightings assigned to one or more portions of the extracted information that can also be used with subsequent classification. To assist with management and classification, timestamp information can also be included in the metadata.

In a similar manner, voicemails can be integrated into the unified communications appliance 100 with the cooperation of the voicemail integration module 145 and the analysis module 115. This process can further be simplified by enterprise-type voicemail systems that automatically incorporate voicemail messages into an email client. Thus, the voicemail integration module 145, cooperating with the speech-to-text module 130, and the analysis module 115, can operate independently and directly on a stored voicemail message, for example cooperating with a voicemail server (not shown), or the functionality extended to cooperate with the email integration module 105 in the instance where the voicemail is forwarded to an email client as a digital audio file.

Therefore, to assist with integration into the unified communications appliance 100, the voicemail integration module 145 first extracts caller ID information. Optionally, this caller-ID information can be cross-correlated to information in a user's address book, or other lookup, to assist with determining a name associated with the voicemail. This process could also work in reverse when the network-supplied caller ID information is a name. In a similar manner, this name could be cross-correlated to information in an address book, or other lookup and the accompanying phone number extracted and preserved as metadata to assist with classification.

In addition, the voicemail can be analyzed, and for example with the cooperation of the speech-to-text module 130, converted into a text-based message. In a similar manner to emails, the voicemail message could then be analyzed for content, keywords, voice recognition and in general any property that can be used to assist with classification of the voicemail message. This extracted information can then be saved with the voicemail message in, for example, database 180.

The call module 150, also cooperating with the analysis module 115 and the speech-to-text module 130, is capable of integrating telephone conversations into the unified communications appliance 100. This operation can either be performed in real-time, or offline where the conversation is recorded and stored in database 180. An initial step would be for the call module 150 to extract caller ID information for the call participants. For an inbound call, this can include caller ID information of the calling party, as well as the identity of the called party. In a similar manner, for an outbound call, the identity of the calling party could be recorded along with the number dialed, and date and time stamp information. The date and time stamp information can be used as the basis for determining the duration of the call which could also be stored as metadata to assist with further classification. In a similar manner to that discussed above in relation to the voicemail integration module 145, caller or callee information could also be cross-correlated to an address book or other lookup to facilitate the extraction of additional information associated with the call. Likewise, speech-to-text conversion, with the cooperation of the speech-to-text module 130, can be utilized to save a text-based version of the call. One or more portions of this extracted information can then be stored to assist with further classification. A user entered "subject" could also be associated with the outbound call as well as one or more notes to assist with memorializing the call and subsequent classification.

The calendar integration module 160 cooperates with the analysis module 115 to assemble calendared items, such as appointments, into the unified communications appliance 100. Subject line information associated with a calendared item could be extracted therefrom. Additionally, information such as the invitee, host, location information as well as any content associated with the calendar item could be extracted and used for supplemental classification of the calendared item into the unified communications appliance 100. This information could then be stored in the database 180 to assist with classification.

The document integration module 175 cooperates with the analysis module 115 to assist with assimilation of various documents into the unified communications appliance 100. As discussed, the document can be any digital document or content including, but not limited to, one or more of text documents, image documents, multimedia documents, presentation documents, or in general, any digital content. For assimilation and integration into the unified communications appliance 100, optical character recognition can be performed on the incoming document, if required. Information such as the title of the document, file, author, editors, creation date, version number, and the like can then be extracted to assist with classification. Additionally, and similar to the process described above, metadata and document content analysis can also be performed with key word identification and weighting applied to assist with subsequent classification.

The basic processes discussed above can be applied in a similar manner to the SMS integration module 110, IM integration module 155, conference call integration module 165 and other communication integration module 170. For example, the SMS integration module 110 can operate in a similar manner to the email integration module 105 with the cooperation of the analysis module 115 and content module 120. Various types of information can be extracted from a received or sent SMS message with this information being stored for later classification.

In a similar manner, the instant message integration module 155 cooperates with the analysis module 115 and content module 120 to extract information related to the sent and received instant messages such as, for example, sender, receiver, subject line, content, and the like, which is then used for subsequent classification as discussed.

The conference call integration module 165 can operate in a similar manner to the call module 150, with the capability of real-time or off-line extraction of information to assist with classification in the unified communications appliance 100.

In a similar manner to that discussed above in relation to the email integration module 105, each of the other integration modules can be appropriately configured to interface with the communications feed to which it is associated. As discussed, this operation can occur in parallel to the operation of the device with which the communications feed is associated, or, the functionality of the communications device supplying the feed can be incorporated into the unified communications appliance, and in particular, the specific integration module with which the information feed is associated. For example, and as discussed above, the email integration module 105 can incorporate similar functionality to a conventional email client. This can be extended to any of the other integration modules with the underlying functionality associated with their respective conventional clients integrated therein.

Classification of the various information is performed by the classification module 105, cooperating with one or more of the content/contacts module 120, processor 135, memory 140 and database 180. The classification module 115 retrieves the classification information, such as the metadata information discussed above, from database 180. This classification is compared to one or more existing "conversations" or subjects 250-290 as, for example, illustrated in interface 200. A determination is then made whether the information appears to be associated with an existing conversation or subject. If no association can be determined, a new, or nested, "conversation" or subject can be created. Optionally, the user can be queried whether they would like to title the conversation or subject, or whether an optional automatically generated subject line determined by the classification module 115 should be used. Once associated, a new "conversation" or subject with the subject line is created to which various types of information can then be associated.

Alternatively, if the information appears to be associated with an already existing "conversation" or subject, the user can optionally be queried as to whether the automatically-determined classification is correct. If it is not correct, the information can be reassociated with another existing "conversation" or subject, or a new subject assigned thereto.

Having determined the appropriate "conversation" or subject to which the information is associated, an icon representing the type of communication, such as its original modality, is associated with the communication and the communication or information integrated into the interface, such as illustrated in interface 200.

Therefore, as the various information feeds supply information to the unified communications appliance 100, the interface 200 is populated with representation of the type and number of communications or information associated with each conversation or subject.

Management of the conversations illustrated in interface 200 can be facilitated by allowing sorting based on one or more of the columns, for example, sorting alpha by subject, time by most recent or oldest, and in general sorted in accordance with any user preference. Moreover, tools can be provided in interface 200 (not shown) that allow one or more of merging conversations, extracting information from a first conversation, and associating that information with a second conversation, associating information with multiple conversations, deletion of conversations, archiving of conversations, forwarding of entire conversations to another party, and the like. Additionally, functionality such as that traditionally seen with email clients can be extended to apply across modalities for one or more conversations. For example, a user could select the product telephone conference conversation 280 and elect to "reply to all" to the 10 pieces of information associated with that conversation. In this particular example, there were 3 calls received from a cell phone, 4 calls received from a land-line telephone, and 3 emails. Upon selecting "reply to all" the unified communications appliance 100, cooperating with the integration module with which the information is associated, can construct an appropriate methodology to reply to the information.

More specifically, assume a user wants to send a message in response to each of the pieces of information associated with a conversation. A user, upon selecting a "reply to" button in the interface, could then type a message for distribution to each of the calls and email. The unified communications appliance 100 could optionally query the user as to whether the responses should be sent in the same modality as received, or whether, for example, with the cross-correlation to contact information in an address book or similar lookup, a different modality be used. Assuming the user optionally selects to respond to all using the native modality in which the information was received, the unified communications appliance, cooperating with the text-to-speech module 130 as appropriate, could translate the typed message of the user, automatically dial the respective numbers associated with each of the telephone calls, and upon completion of the call to the called party, play the message to the called party. In a similar manner, the message entered by the user can be forwarded, via email, to each of the 3 email-based pieces of information associated with the product telephone conference conversation 280.

FIG. 3 illustrates an exemplary interface 300 that includes in greater detail a representation of conversation 280. Upon selection of the conversation 280, for example with the click of a mouse, the conversation is expanded to illustrate each of the types of information associated with a conversation, the native modality of that information, and information such as who the information is from, time and/or date stamp information, size information, and the like. In this particular example, the user selected the product telephone conference conversation 280, which, when expanded, shows the 3 cell phone calls, 4 land-line telephone calls, and 3 email messages. The interface is further sorted by time with the most recent email from Scott, VP, Jill, Team 1 and Team 2 shown at the bottom of the interface 330. Additionally, if the user were to click on, for example with a mouse, the portion 330 of interface 300, preview portion 340 could be displayed with the contents of the email 330 that were received at 5:23 p.m.

Upon selection of the product telephone conference conversation 280, the conversation is expanded with the various communications 310 shown in a drop-down form. Similar to the interface shown in FIG. 2, various sorts can be performed on the information 312-330 based on, for example, time, to or from information, and the like.

To access any of the various portions of information 312-330, a user can select, for example with the click of a mouse, as desired. The user can optionally be provided with the ability to select how they would like to view, hear or see the information, with the information being translated by the text-to-speech or speech-to-text module 130 as appropriated. For example, if a user is mobile, and would like to listen to the email 318, the text-to-speech module 130 could convert the text in the email to speech which could then be played to a user.

Since the unified communications appliance 100 is capable of storing any of the various portions of information, or maintaining a link to where the information is stored, regardless of the modality, unified communications appliance 100 is capable of playing back or displaying the information to the user. This applies not only to the emails, voicemails and messages, but can also apply to video conferences, webinars, or in general any type of information on any modality.

Figure 4:
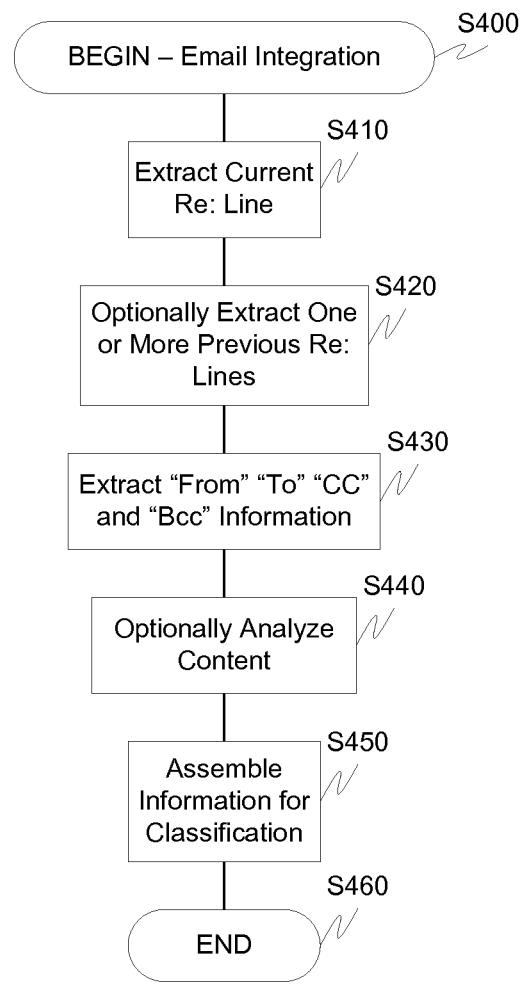
FIG. 4 is a flowchart outlining an exemplary method for email integration according to this invention.

FIG. 4 is a flowchart outlining an exemplary method for integrating email according to this invention. In particular, control begins in step S400 and continues to step S410. In step S410, the current re: line is extracted from the email. Next, in step S420, one or more previous re: lines can optionally be extracted through parsing of the body of the email. Then, in step S430, one or more of "from" "to" "cc" and "bcc" information can optionally be extracted. Control then continues to step S440.

In step S440, the content and/or attachments of the email can optionally be analyzed. Next, in step S450, the various portions of extracted information can be assembled for classification. Control then continues to step S460 where the control sequence ends.

Figure 5:
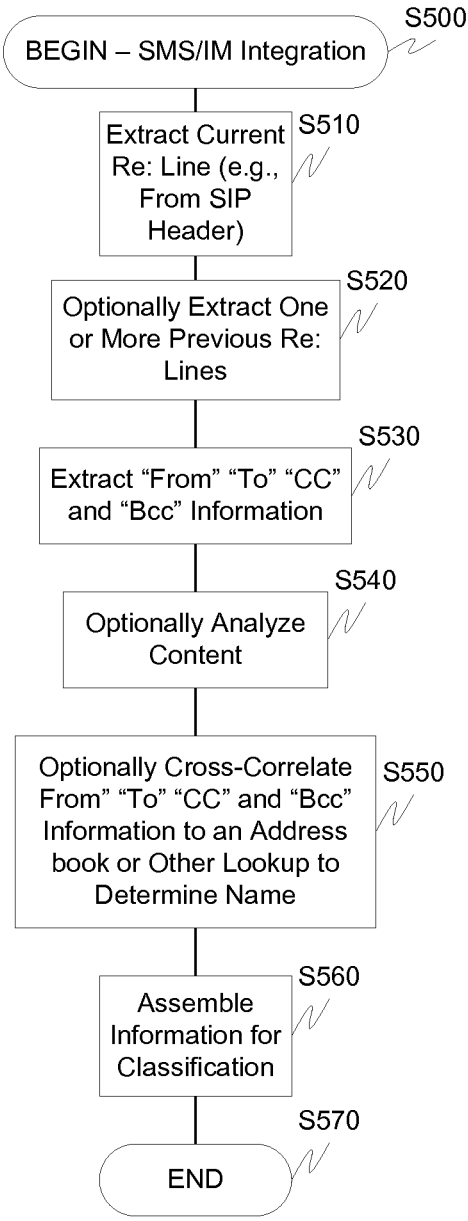
FIG. 5 is a flowchart illustrating an exemplary method for SMS/IM integration according to this invention.

FIG. 5 outlines an exemplary method for SMS or instant message integration according to this invention. In particular, control begins in step S500 and continues to step S510. In step S510, re: line information is extracted. This can be particularly easy to accomplish if the SMS or instant message is conveyed via a session initiation protocol (SIP). Next, in step S520, one or more previous re: lines can optionally by extracted from the message. Then, in step S530, "from", "to", "cc" and "bcc" information can also optionally be extracted with control continuing to step S540.

In step S540, the content of the message can optionally be analyzed. Next, in step S550, the "to" and "from" information can optionally be cross-correlated to information in one or more address books or other lookups to assist with determining a name, or number, associated with one or more of the "sender" or "receivers" of the message. Control then continues to step S560.

In step S560, the various extracted information is assembled for later classification. Control then continues to step S570 where the control sequence ends.

Figure 6:
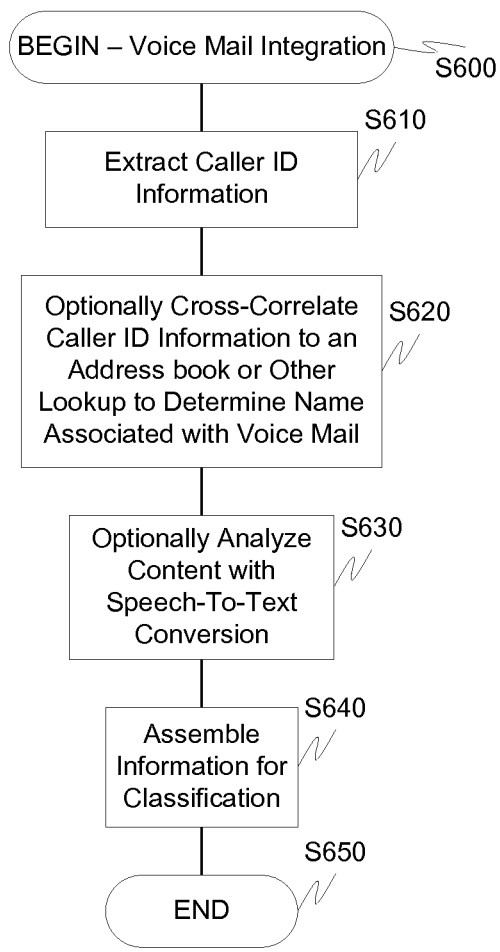
FIG. 6 is flowchart illustrating an exemplary method for voicemail integration according to this invention.

FIG. 6 outlines an exemplary method of voicemail integration according to this invention. In particular, control begins in step S600 and continues to step S610. In step S610, caller ID information is extracted. As discussed, the caller ID information can be supplemented with information relating to the caller as well as, in step S620, optionally cross-correlated with the assistance of an address book or lookup table to additional name or number information. Then, in step S630, and after a speech-to-text conversion, the content of the voice message can optionally be analyzed. Control then continues to step S640.

In step S640, the various extracted information can be assembled for subsequent classification. Control then continues to step S650 where the control sequence ends.

Figure 7:
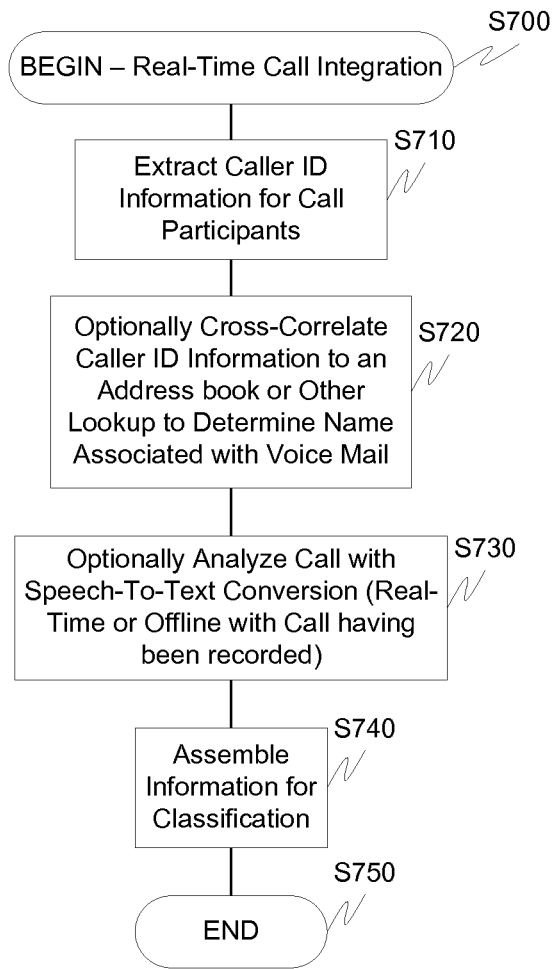
FIG. 7 is flowchart outlining an exemplary method for real-time call integration according to this invention.

FIG. 7 outlines an exemplary method for real-time call integration according to this invention. This basic methodology can also be extended to conference calls and webinars for integration into the unified communications appliance. In particular, control begins in step S700 and continues to step S710. In step S710, information, such as caller ID information is extracted for all the conference participants. Next, in step S720, an optionally in cooperation with an address book or other lookup table, the extracted information in step S710 can be cross-correlated to other information, such as name, number, email address, or the like. Then, in step S730, and optionally in conjunction with a speech-to-text converter, the content of the conference can be analyzed. This information is then assembled in step S740 for later classification with control continuing to step S750 where the control sequence ends.

Figure 8:
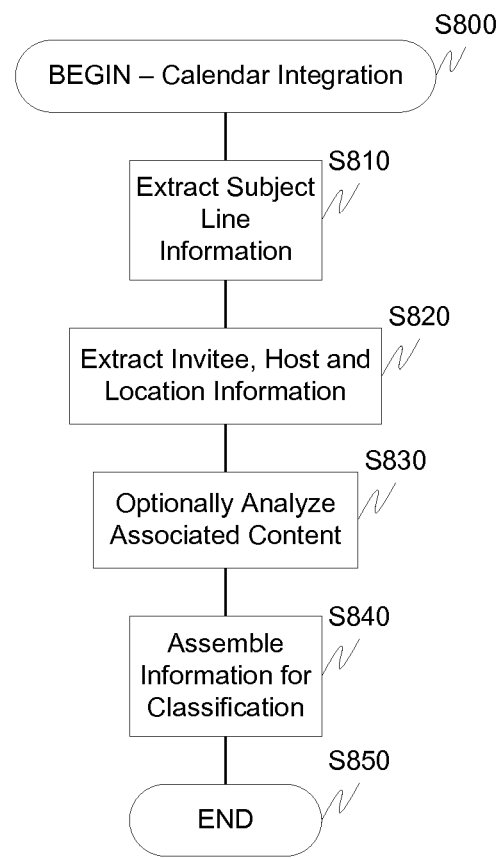
FIG. 8 is a flowchart outlining an exemplary method for calendar integration according to this invention.

FIG. 8 outlines an exemplary method for calendar integration according to this invention. In particular, control begins in step S800 and continues to step S810. In step S810, subject line information is extracted from a calendar entry. Next, in step S820, one or more of invitee, host and location information is extracted. Then, in step S830, any content associated with the calendar entry can be optionally analyzed. Control then continues to step S840.

In step S840, the various portions of extracted information are assembled for later classification with control continuing to step S850 where the control sequence ends.

Figure 9:
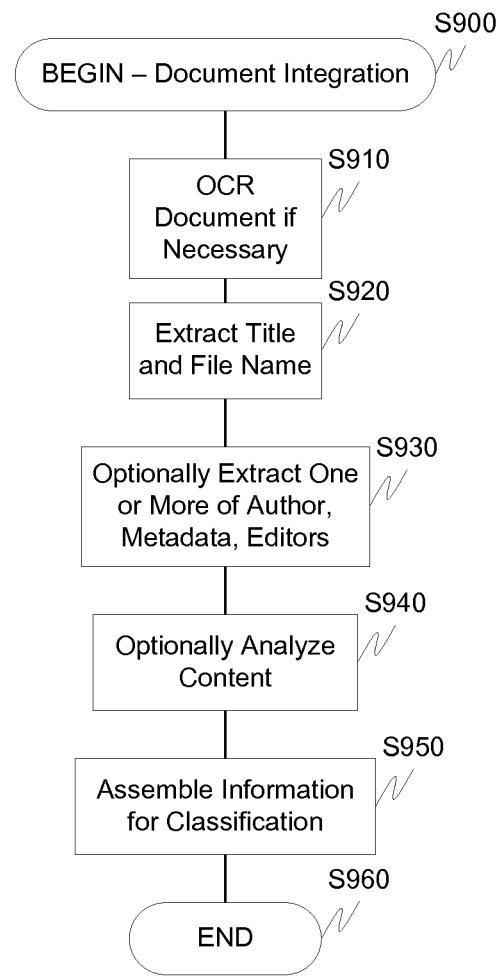
FIG. 9 is a flowchart illustrating an exemplary method for document integration according to this invention.

FIG. 9 illustrates an exemplary method for document integration according to this invention. In particular, control begins in step S900 and continues to step S910. In step S910, and if necessary, optical character recognition can be performed on the integrated document. Next, in step S920, title and file name information can also be extracted. Then, in step S930, one or more of authors, editors, and metadata can optionally be extracted. Control then continues to step S940.

In step S940, the content of the document can optionally be analyzed where, as needed, speech-to-text functionality employed. Then, in step S950, the various portions of extracted information are assembled for classification with control continuing to step S960 where the control sequence ends.

Figure 10:
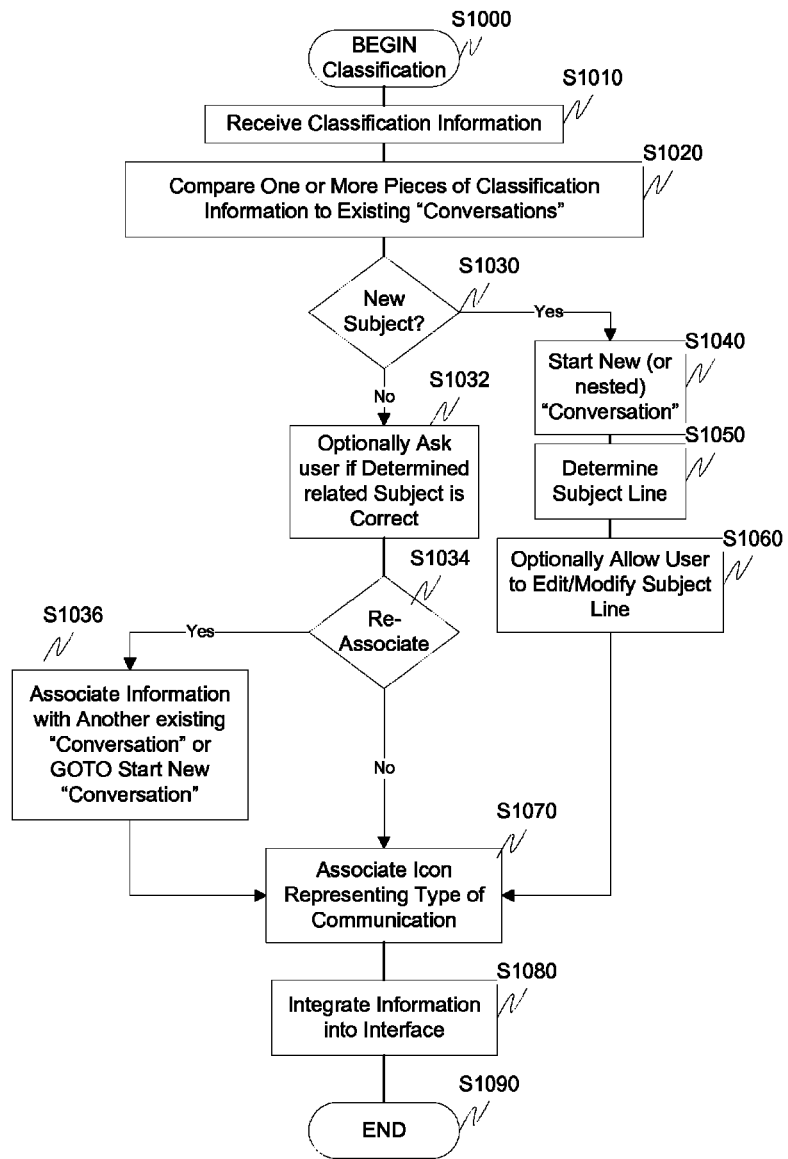
FIG. 10 is a flowchart outlining an exemplary method for classifying information according to this invention.

FIG. 10 outlines an exemplary method of classification of various pieces of information according to this invention. In particular, control begins in step 1000 and continues to step S1010. In step S1010, classification information is received. Next, in step S1020, one or more portions of the classification information are compared to existing conversations. Then, in step S1030, a determination is made whether a match has been found. If a match is not found, it is assumed that the conversation is a new subject, with control continuing to step S1040. Otherwise, control jumps to step S1032.

In step S1040, a new, or nested, conversation is started. Next, in step S1050, the system can optionally automatically determine a subject line based on one or more of the received classification information content or context of the information. Then, in step S1060, the user can optionally be allowed to edit or modify the determined subject line. Control then continues to step S1070.

In step S1032, a user can optionally be queried as to whether the determined related subject or conversation is correct. In step S1030, a determination is made whether reassociation is required, based on the answer in step S1032. If reassociation with another conversation is required, control continues to step S1036. Otherwise, control jumps to step S1070.

In step S1036, the user has the ability of associating the information with another existing conversation or starting a new conversation. Control then continues to step S1070.

In step S1070, an icon is associated with the information representing the type of communication or information in its native modality. Next, in step S1080, the information is integrated into the unified communications appliance interface with control continuing to step S1090 where the control sequence ends.

Figure 11:
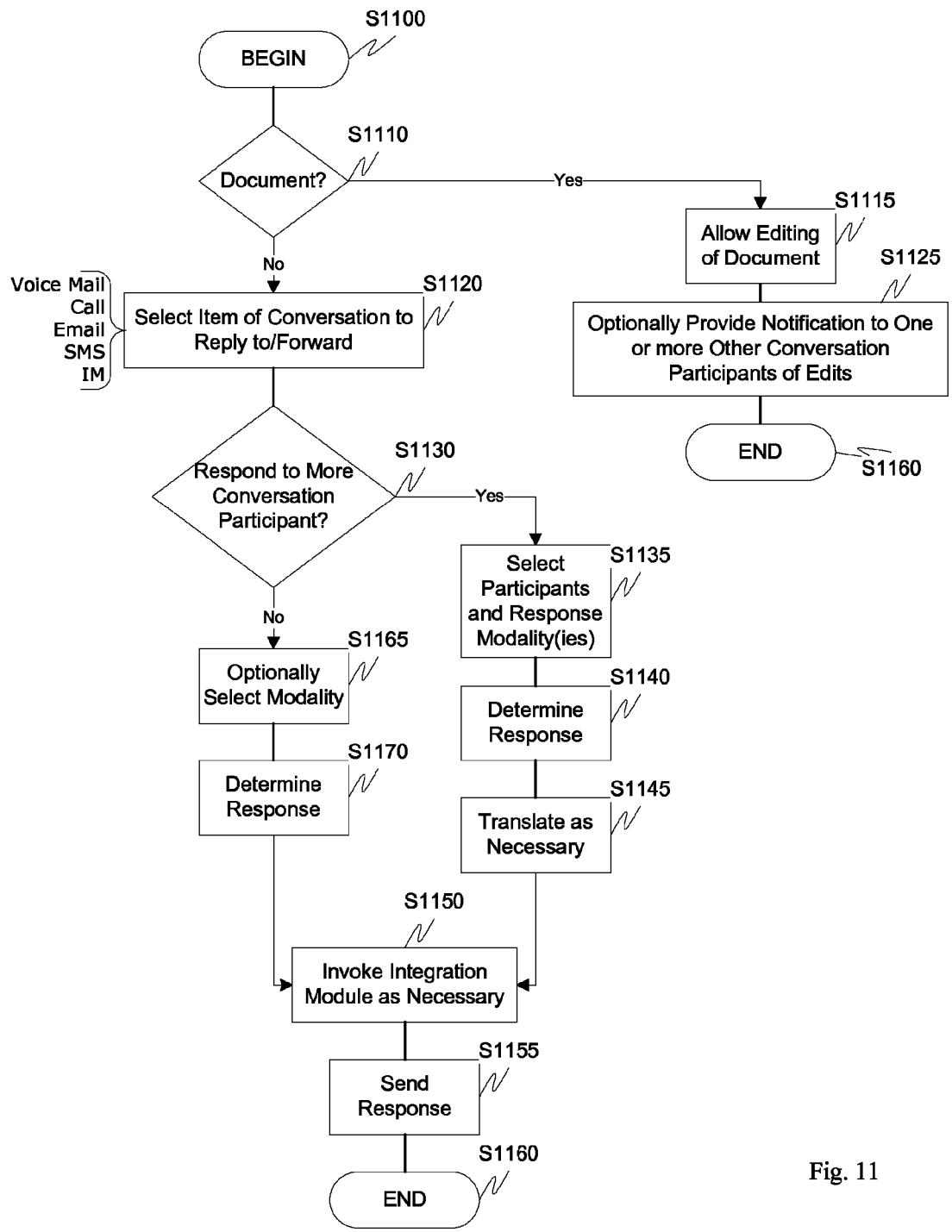
FIG. 11 is a flowchart outlining an exemplary method for responding to a communication according to this invention.

FIG. 11 outlines an exemplary embodiment of responding to a conversation item according to an exemplary embodiment of this invention. In particular, control begins in step S1100 and continues to step S1110. In step S1110, a determination is made whether a user desires to edit a document. If so, control jumps to step S1185 where the user is allowed to edit the document. Then, in step S1125, notification is optionally provided to one or more of the other conversation participants. For example, an appropriate interface can be provided that allows the user to select who of the conversation participants should receive the notification. Control then continues to step S1160 where the control sequence ends.

In step S120, and if the user elects to reply or forward a conversation item (e.g., voicemail, call, email, SMS, IM or the like) the user can select that item, for example, with the click of a mouse. Next, in step S1130, the user can determine whether the response is to be sent to more than one sender. If the response is to be sent to more than one conversation participant, control continues to step S1135. Otherwise, control jumps to step S1165.

In step S1135, the user selects the participants to which the response should be sent, and the modalities of each of the responses. It should be appreciated, that each of the responses can have its own separate and distinct and different modality, or, for example, the user could select to respond to all conversation participants using the same modality, regardless of the selected item modality. Next, in step S1140, the user determines the response with, in step S1145, the response translated as necessary as discussed above. For example, text-to-speech, speech-to-text or other translation as necessary can be performed such that the response is converted into the selected modality for that participant. Control then continues to step S1150.

In step S1165, and if only one conversation participant is being responded to, the user can select the desired modality of the response, with, in step S1170, the user determining the response. Control then continues to step S1150.

In step S1150, an appropriate integration module is invoked to assist with the sending of the response, as necessary. Next, in step S1155, the response is sent with control continuing to step S1160 where the control sequence ends.

In addition, and in accordance with one exemplary embodiment, this response is also added to the conversation with an indication of the modality(ies) of the response. As with the other conversation items discussed herein, information such as subject information, to, from, time and date stamp information, size information, and the like can be associated with this item in the conversation.

Furthermore, in accordance with another exemplary embodiment, supplemental to, or alternatively, the icons representing the modalities in the conversation could be supplemented with, or replaced by, avitars that represent one or more of the conversation participant, and modality of the conversation item.

A number of variations and modifications of the invention can be used. It would be possible to provide or claims for some features of the invention without providing or claiming others.

The exemplary systems and methods of this invention have been described in relation to enhancing communications, and in particular conversations. However, to avoid unnecessarily obscuring the present invention, the description omits a number of known structures and devices. This omission is not to be construed as a limitation of the scope of the claimed invention. Specific details are set forth to provide an understanding of the present invention. It should however be appreciated that the present invention may be practiced in a variety of ways beyond the specific detail set forth herein.

Furthermore, while the exemplary embodiments illustrated herein show various components of the system collocated; certain components of the system can be located remotely, at distant portions of a distributed network, such as a LAN, cable network, and/or the Internet, or within a dedicated system. Thus, it should be appreciated, that the components of the system can be combined in to one or more devices, such as a gateway, or collocated on a particular node of a distributed network, such as an analog and/or digital communications network, a packet-switch network, a circuit-switched network or a cable network.

It will be appreciated from the preceding description, and for reasons of computational efficiency, that the components of the system can be arranged at any location within a distributed network of components without affecting the operation of the system. For example, the various components can be located in a switch such as a PBX and media server, gateway, a cable provider, enterprise system, in one or more communications devices, at one or more users' premises, or some combination thereof. Similarly, one or more functional portions of the system could be distributed between a communications device(s) and an associated computing device.

Furthermore, it should be appreciated that the various links, such as link 5, connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the invention.

In yet another embodiment, the systems and methods of this invention can be implemented in conjunction with a special purpose computer, a programmed microprocessor or microcontroller and peripheral integrated circuit element(s), an ASICS or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this invention.

Exemplary hardware that can be used for the present invention includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a computer-readable storage medium, executed on programmed general-purpose computer with the cooperation of a controller and memory, a special purpose computer, a microprocessor, or the like. In these instances, the systems and methods of this invention can be implemented as a program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present invention describes components and functions implemented in the embodiments with reference to particular standards and protocols, the invention is not limited to such standards and protocols. Other similar standards and protocols not mentioned herein are in existence and are considered to be included in the present invention. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present invention.

The present invention, in various embodiments, configurations, and aspects, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and/or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments, configurations, or aspects for the purpose of streamlining the disclosure. The features of the embodiments, configurations, or aspects of the invention may be combined in alternate embodiments, configurations, or aspects other than those discussed above. This method of disclosure is not to be interpreted as reflecting an intention that the claimed invention requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the invention.

Moreover, though the description of the invention has included description of one or more embodiments, configurations, or aspects and certain variations and modifications, other variations, combinations, and modifications are within the scope of the invention, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

The invention claimed is:

1. A method for modality-independent unified communications comprising:
   receiving information from a plurality of different modality sources, wherein the information is based on at least one or more user conversations between a plurality of users;
   integrating the information into a modality-independent unified communications appliance;
   grouping the integrated information based on a common subject; and
   displaying one or more portions of the at least one or more user conversations in an interface, each user conversation including a representation of a number and type of the received information.

2. The method of claim 1, further comprising translating the information from a first modality to a second, different, modality.

3. The method of claim 1, wherein the information is from one or more of a phone, a cell phone, a PDA, an email server, file storage, a conference call, a multimedia conference and a communications device.

4. The method of claim 1, further comprising classifying the information based on one or more additional common subjects.

5. The method of claim 1, further comprising selectively allowing a user to respond to one or more of the different modality sources using one or more modalities of communication, wherein a response modality can be different than a received modality.

6. The method of claim 1, further comprising prompting a user for a classification of the common subject.

7. The method of claim 1, wherein functionality of respective modality specific interfaces is incorporated into the modality-independent unified communications appliance.

8. One or more means for performing the steps of claim 1.

9. A computer-readable storage media having stored thereon instructions, that when executed by a processor, perform the steps in claim 1.

10. The method of claim 1, wherein the information is based on a plurality of user conversations in different modalities and further comprising the steps of:
    detecting a replay to all response in a first modality; and
    in response to detecting the reply to all response, responding to the plurality of user conversations in the respective different modalities, wherein the different modalities are not the first modality.

11. The method of claim 1, wherein the information further comprises a plurality of documents and wherein the displaying step further comprises displaying the plurality of documents including a representation of a number and type of the received documents at the same time as the representation of a number and type of the received information for each user conversation.

12. The method of claim 2, wherein the first modality is a voice mail and the second modality is an email and wherein the translating step further comprises putting a caller ID, a date, and a time of the voice mail in a "Re" line of the email.

13. A modality-independent unified communications appliance comprising:
one or more integration modules that receive information from a plurality of different modality sources and integrate the information into the modality-independent unified communications appliance, wherein the information is based on at least one or more user conversations between a plurality of users;
an analysis module that groups the integrated information based on a common subject; and
an interface module that displays one or more portions of the at least one or more user conversations in an interface, each user conversation including a representation of a number and type of the received information.

14. The system of claim 13, further comprising a conversion module that translates the information from a first modality to a second, different, modality.

15. The system of claim 13, wherein the information is one or more of an email, a SMS, an Instant Message, calendar information, a voicemail, a conference call and a document.

16. The system of claim 13, wherein the information is from one or more of a phone, a cell phone, a PDA, an email server, file storage, a conference call, a multimedia conference and a communications device.

17. The system of claim 13, wherein the information is based on one or more additional common subjects.

18. The system of claim 13, further comprising an interface that selectively allows a user to respond to one or more of the different modality sources using one or more modalities of communication, wherein a response modality can be different than a received modality.

19. The system of claim 13, further comprising a classification module that prompts a user for a classification of the common subject.

20. The system of claim 13, wherein functionality of respective modality specific interfaces is incorporated into the modality-independent unified communications appliance.

* * * * *